(12) United States Patent
Keller et al.

(10) Patent No.: US 10,779,583 B2
(45) Date of Patent: Sep. 22, 2020

(54) ACTUATED TENDON PAIRS IN A VIRTUAL REALITY DEVICE

(71) Applicant: Facebook Technologies, LLC, Menlo Park, CA (US)

(72) Inventors: Sean Jason Keller, Kirkland, WA (US); David R. Perek, Bellevue, WA (US); Tristan Thomas Trutna, Seattle, WA (US); Garett Andrew Ochs, Seattle, WA (US); Nicholas Roy Corson, Mukilteo, WA (US); Raymond King, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 517 days.

(21) Appl. No.: 15/270,222

(22) Filed: Sep. 20, 2016

(65) Prior Publication Data
US 2018/0077976 A1    Mar. 22, 2018

(51) Int. Cl.
*A41D 1/00*    (2018.01)
*A41D 19/00*    (2006.01)
*G06F 3/01*    (2006.01)

(52) U.S. Cl.
CPC ............ *A41D 1/005* (2013.01); *A41D 19/00* (2013.01); *G06F 3/014* (2013.01); *G06F 3/016* (2013.01)

(58) Field of Classification Search
CPC ........ A41D 1/005; A41D 19/00; G06F 3/014; G06F 3/016
See application file for complete search history.

(56) References Cited

U.S. PATENT DOCUMENTS

| | | | |
|---|---|---|---|
| 9,741,216 B1 * | 8/2017 | Keller | G06F 3/014 |
| 9,996,153 B1 * | 6/2018 | Trotta | G06F 3/014 |
| 2015/0310762 A1 * | 10/2015 | Seim | G09B 15/00 434/113 |
| 2016/0259417 A1 * | 9/2016 | Gu | G06F 3/016 |
| 2016/0296838 A1 * | 10/2016 | Goetgeluk | A63F 13/285 |
| 2017/0168576 A1 * | 6/2017 | Keller | G06F 3/016 |
| 2017/0300115 A1 * | 10/2017 | Kerr | G06F 3/016 |
| 2017/0319950 A1 * | 11/2017 | Buchanan, IV | A63F 13/42 |
| 2018/0077976 A1 * | 3/2018 | Keller | A41D 1/005 |
| 2018/0081436 A1 * | 3/2018 | Keller | G06F 3/016 |
| 2018/0098583 A1 * | 4/2018 | Keller | A41D 19/0034 |
| 2018/0107277 A1 * | 4/2018 | Keller | G06F 3/014 |
| 2018/0239428 A1 * | 8/2018 | Maheriya | G06F 3/014 |
| 2018/0311570 A1 * | 11/2018 | Buchanan | A63F 13/42 |

* cited by examiner

*Primary Examiner* — Richale L Quinn
(74) *Attorney, Agent, or Firm* — Fenwick & West LLP

(57) ABSTRACT

A haptic glove includes a glove body including a glove digit corresponding to a phalange of a user hand. The glove digit has a pair of flexible tendons, including a first and a second tendon, which are parallel to a bend centerline that bisects a surface of the glove digit. The first and second tendons are positioned respectively on opposite sides of the bend centerline. The haptic glove further comprises an actuator coupled to the glove body and the first and second tendons, the actuator configured to actuate the tendons to control movement of the glove digit.

12 Claims, 4 Drawing Sheets

ACTUATED TENDON PAIRS IN A VIRTUAL REALITY DEVICE

BACKGROUND

Virtual reality (VR) is a simulated environment created by computer technology, and augmented reality (AR) is a live direct or indirect view of a physical, real-world environment whose elements are augmented (or supplemented) by computer technology. VR or AR can be presented to a user through a VR/AR system. Typically, a VR/AR system includes a VR/AR headset that provides visual and audio information to the user. Conventional VR/AR systems create virtual body parts (e.g., a virtual hand) in the simulated environment and use a tracking system to track a user movement in a physical space. The simulated environment presented to the user may be updated according to the user movement in the physical space. However, such systems generally do not prevent or control the user movement in the physical space, as the user is in contact with virtual objects in the simulated environment. As a result, a user cannot perceive a feeling of touching a virtual object.

SUMMARY

Haptic feedback is provided to a user via a haptic feedback mechanism. The haptic feedback mechanism provides an amount of a resistance to a physical movement of a portion of a user. In some embodiments, the amount of resistance is in accordance with a virtual position corresponding to a physical position of the portion of the user. The haptic feedback facilitates an illusion that a user is interacting with a real object, when in fact the object is a virtual object.

The haptic feedback mechanism resists movement by one or more portions of a user's body. For example, in some embodiments, the haptic feedback mechanism is part of a haptic glove (in other embodiments it may be part of a sleeve). The haptic glove includes a glove body and one or more glove digits. The one or more glove digits correspond to respective phalanges of a hand of a user. At least one of the glove digits has a pair of flexible tendons, including a first and a second tendon. The first and second tendons are positioned on either side of a bend center line that runs along a top surface of the digit. In such embodiments, lengths of the first and second tendons are parallel to the bend centerline of the digit. In some embodiments, the first and second tendons are formed symmetrically and equidistant from the bend centerline.

In some embodiments, one or more actuators may be coupled to the glove body and configured to control movement of the first and second tendons by actuating the first and second tendons.

Moreover, in some embodiments, at least one of the glove digits includes one or more flexible tendons that are positioned a back surface of the digit that is opposite the top surface of the digit. These tendons may, e.g., be used to resist flexion, resist extension, or some combination thereof.

Although discussed in terms of Systems, devices described herein can be used with augmented reality (AR) systems and any other feedback/control interfaces designed to give users a more immersive experience within a computing environment.

DETAILED DESCRIPTION

System Overview

Figure 1:
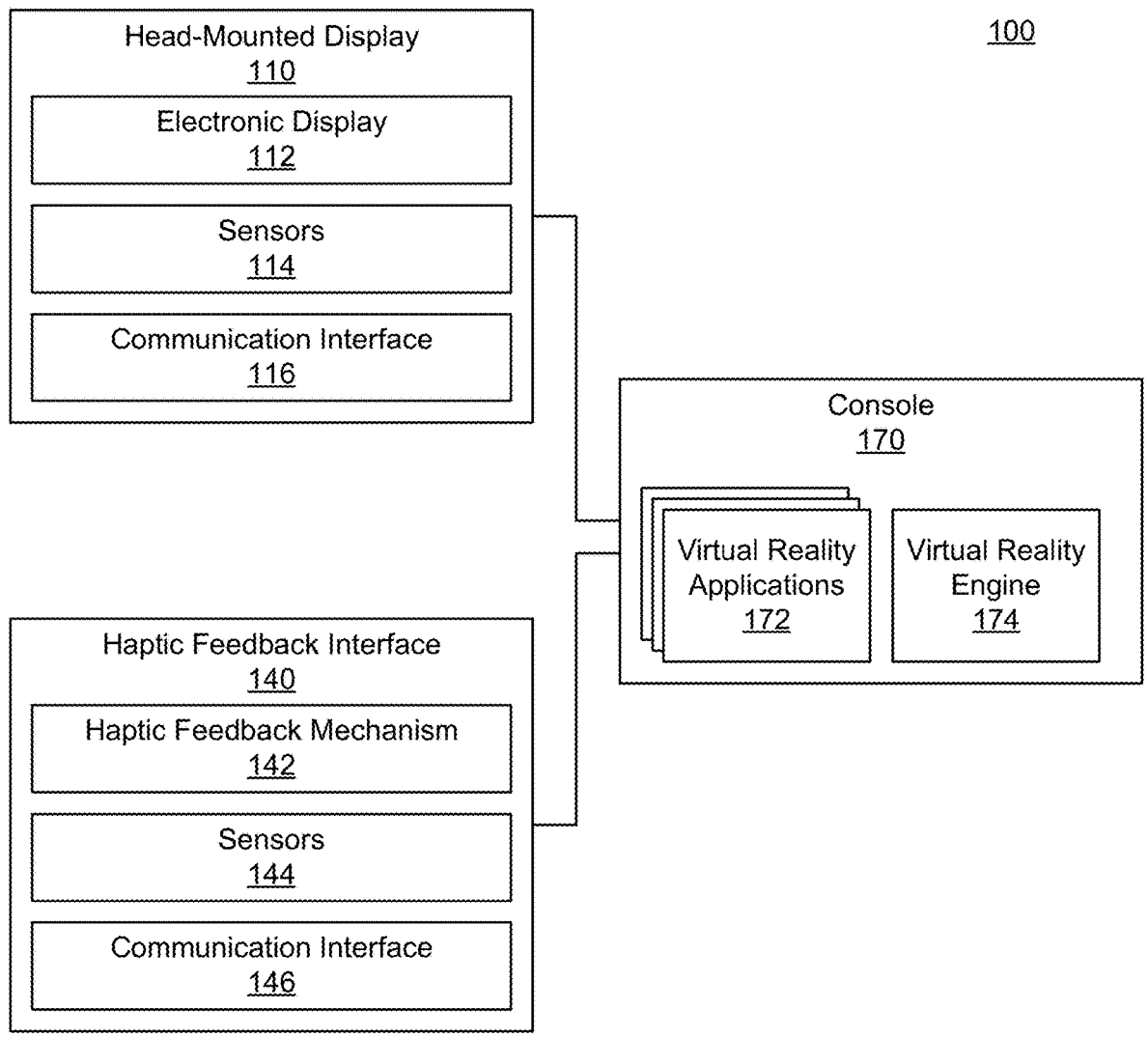
FIG. 1 is a block diagram of a system including a haptic feedback interface, in accordance with an embodiment.

FIG. 1 is a block diagram of a system 100 in which a haptic feedback interface 140 operates, according to one or more embodiments. In some embodiments, the system 100 operates in AR and/or mixed reality (MR) environments. The system 100 shown in FIG. 1 comprises a head-mounted display (HMD) 110 and the haptic feedback interface 140 that are both coupled to a console 170. While FIG. 1 shows an example system 100 including one HMD 110 and one haptic feedback interface 140, in other embodiments any number of these components may be included in the system 100. For example, the system 100 may include two haptic feedback interfaces 140 (e.g., one for each hand) that are worn by the same user. As another example, the system 100 may include multiple haptic feedback interfaces 140 intended to be worn by multiple users, with each haptic feedback interface 140 or each pair of haptic feedback interfaces 140 associated with a different HMD 110. In alternative configurations, different and/or additional components may be included in the system environment 100.

The HMD 110 is a head-mounted display that presents media to a user. Examples of media presented by the HMD 110 include images, video, audio, or some combination thereof. In some embodiments, audio is presented via an external device (e.g., speakers and/or headphones) that receives audio information from the HMD 110, the console 170, or both, and presents audio data based on the audio information. The HMD 110 may augment views of a physical, real-world environment with computer-generated elements (e.g., images, video, sound, etc.).

The HMD 110 includes an electronic display 112, sensors 114, and a communication interface 116. The electronic display 112 displays images to the user in accordance with data received from the console 170. In various embodiments, the electronic display 112 may comprise a single electronic display 112 or multiple electronic displays 112 (e.g., one display for each eye of a user).

The sensors 114 include one or more hardware devices that detect spatial and motion information about the HMD 110. Spatial and motion information can include information about the position, orientation, velocity, rotation, and acceleration of the VR headset 110. For example, the sensors 114 may include a gyroscope that detects rotation of the user's head while the user is wearing the HMD 110. This rotation information can then be used (e.g., by the VR engine 174) to adjust the images displayed on the electronic display 112.

The communication interface 116 enables input and output to the console 170. In some embodiments, the communication interface 116 is a single communication channel, such as High-Definition Multimedia Interface (HDMI), Universal Serial Bus (USB), Video Graphics Array (VGA), Digital Visual Interface (DVI), DISPLAYPORT™, some other communication channel, or some combination thereof. In other embodiments, the communication interface 116 includes several distinct communication channels operating together or independently. In one embodiment, the communication interface 116 includes wireless connections for sending data collected by the sensors 114 from the HMD 110 to the console 170 but also includes a wired HDMI connection or DVI connection that receives audio/visual data to be rendered on the electronic display 112.

The haptic feedback interface 140 is a garment configured to be worn on a portion of a user's body, such as the user's hand. The haptic feedback interface 140 collects information about the portion of the user's body that can be used as input for virtual reality applications 172 executing on the console 170. Additionally, the haptic feedback interface 140 may provide some resistance to movement (i.e., exert a force) of the portion of the user's body in accordance with instructions from the console 170. In the illustrated embodiment, the haptic feedback interface 140 includes a haptic feedback mechanism 142, sensors 144, and a communication interface 146. The haptic feedback interface 140 may include additional components that are not shown in FIG. 1, such as a power source (e.g., an integrated battery, a connection to an external power source, a container containing compressed air, or some combination thereof).

The haptic feedback mechanism 142 provides haptic feedback to the user by directing the portion of the user's body to move in a particular way or in a particular direction or preventing the portion of the user's body from moving in certain directions or in certain ways. To move a portion of the user's body or apply torque to a joint in the user's body, the haptic feedback mechanism 142 includes a pair of tendons to apply distributed force to a portion of the garment covering part of the user's body. The applied force is experienced by a wearer of the garment. Various embodiments of the haptic feedback mechanism 142 are described in conjunction with FIGS. 2-4.

The sensors 144 include one or more hardware devices that detect spatial and motion information about the haptic feedback interface 140. Spatial and motion information can include information about the position, orientation, velocity, rotation, and acceleration of the haptic feedback interface 140 or any subdivisions of the haptic feedback interface 140. For example, if the haptic feedback interface 140 is a haptic glove, sensors 144 identify positions and orientations of various portions of the haptic glove, such as the fingers, fingertips, knuckles, palm, or wrist.

The communication interface 146 enables input and output to the console 170. In some embodiments, the communication interface 146 is a single communication channel, such as USB. In other embodiments, the communication interface 146 includes several distinct communication channels operating together or independently. For example, the communication interface 146 may include separate communication channels for receiving control signals for the haptic feedback mechanism 142 and sending data from the sensors 144 to the console 170. The one or more communication channels of the communication interface 146 can be implemented as wired or wireless connections.

The console 170 is a computing device that executes virtual reality applications to process input data from the sensors 114 and 144 on the VR headset 110 and haptic feedback interface 140 and provide output data for the electronic display 112 on the VR headset 110 and to the haptic feedback mechanism 142 of the haptic feedback interface 140. The console 170 may be integrated with the VR headset 110 or the haptic feedback interface 140. The console 170 can be implemented as any kind of computing device, such as an integrated system-on-a-chip, a microcontroller, a desktop or laptop computer, a server computer, a tablet, a smart phone, or other mobile device. Thus, the console 170 includes components common to typical computing devices, such as a processor, random access memory, a storage device, a network interface, an I/O interface, and the like.

The processor may be or include one or more graphics processing units (GPUs), microprocessors, or application specific integrated circuits (ASICs). The memory may be or include Random Access Memory (RAM), Read Only Memory (ROM), Dynamic random-access memory (DRAM), Static random-access memory (SRAM), and Magnetoresistive random-access memory (MRAM), and may include firmware, such as static data or fixed instructions, Basic Input/Output System (BIOS), system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, Compact Disc (CD), Digital Versatile Disc (DVD), or other reasonably high capacity addressable or serial storage medium. Multiple storage devices may be provided or be available to the computing device. Some of these storage devices may be external to the computing device, such as network storage or cloud-based storage. The network interface includes an interface to a network and can be implemented as either a wired or wireless interface. The I/O interface interfaces the processor to peripherals (not shown) such as, depending upon the computing device, sensors, displays, cameras, color sensors, microphones, keyboards and USB devices.

In the example shown in FIG. 1, the console 170 further includes VR applications 172 and a virtual reality (VR) engine 174. In some embodiments, the VR applications 172 and the VR engine 174 are implemented as software modules that are stored on the storage device and executed by the processor. Some embodiments of the console 170 include additional or different components than those described in conjunction with FIG. 1. Similarly, the functions further described below may be distributed among components of the console 170 in a different manner than is described here.

Each VR application 172 is a group of instructions that, when executed by a processor, generates virtual reality content for presentation to the user. A VR application 172 may generate VR content in response to inputs received from the user via movement of the HMD 110 or the haptic feedback interface 140. Examples of VR applications 172 include gaming applications, conferencing applications, video playback applications, augmented reality application, or other suitable applications.

The VR engine 174 is a software module that allows VR applications 172 to operate in conjunction with the HMD 110 and haptic feedback interface 140. In some embodiments, the VR engine 174 receives information from sensors 114 on the HMD 110 and provides the information to a VR application 172. Based on the received information, the VR engine 174 determines media content to provide to the HMD 110 for presentation to the user via the electronic display 112 and/or haptic feedback to provide to the haptic feedback interface 140 to provide to the user via the haptic feedback mechanism. For example, if the VR engine 174 receives information from the sensors 114 on the HMD 110 indicating that the user has looked to the left, the VR engine 174 generates content for the HMD 110 that mirrors the user's movement in a virtual environment.

Similarly, in some embodiments the VR engine 174 receives information from the sensors 144 on the haptic feedback interface 140 and provides the information to a VR application 172. The VR application 172 can use the information to perform an action within the virtual world of the VR application 172. For example, if the VR engine 174 receives information from the sensors 144 that the user has closed his fingers around a position corresponding to a coffee mug in the virtual environment and raised his hand, a simulated hand in the VR application 172 picks up the virtual coffee mug and lifts it to a corresponding height.

The VR engine 174 may also provide feedback to the user that the action was performed. The provided feedback may be visual via the electronic display 112 in the HMD 110 (e.g., displaying the simulated hand as it picks up and lifts the virtual coffee mug) or haptic feedback via the haptic feedback mechanism 142 in the haptic feedback interface 140 (e.g., preventing the user's finger's from curling past a certain point to simulate the sensation of touching a solid coffee mug).

Glove Digit with Actuated Tendon Pair

Figure 2:
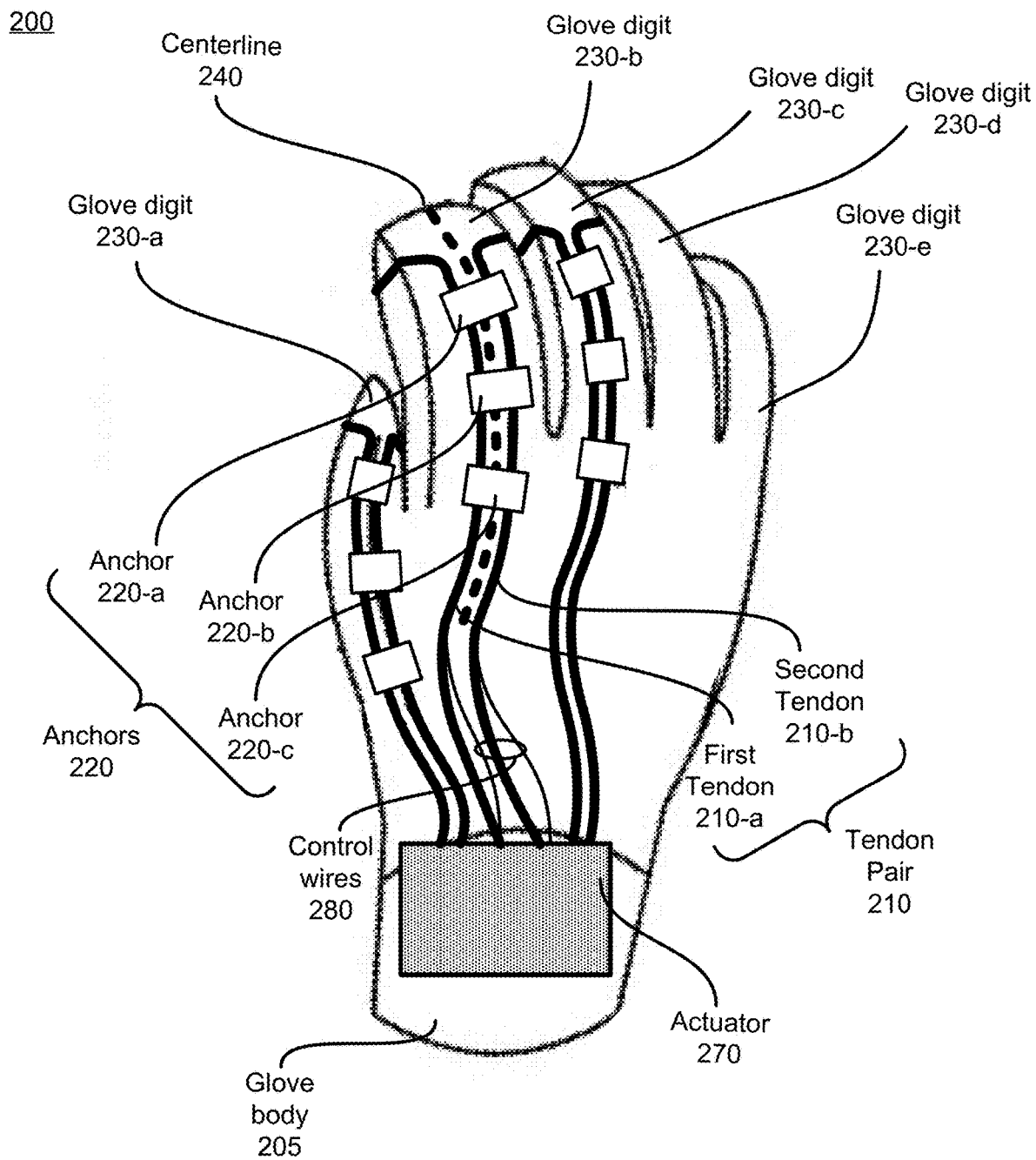
FIG. 2 illustrates a perspective view of a haptic glove, in accordance with one or more embodiments.

FIG. 2 illustrates a perspective view of a haptic glove 200, in accordance with one or more embodiments. The haptic glove 200 includes a glove body 205 having glove digits 230-*a*, 230-*b*, 230-*c*, 230-*d*, and 230-*e*, and an actuator 270. One or more of the glove digits may be provide haptic feedback to a wearer of the haptic glove. For example, as illustrated, haptic glove digits 230-*a*, 230-*b*, and 230-*c* may provide haptic feedback to the user. In alternate embodiments, the haptic glove 200 may be configured to provide haptic feedback via other glove digits.

Each glove digit configured to provide haptic feedback to the user includes a tendon pair 210. As illustrated in FIG. 2, the tendon pair 210 includes a first tendon 210-*a* and a second tendon 210-*b*, to be positioned along a first surface of the phalange of the user hand. For example, the tendon pair 210 may actually be in contact with the first surface of the phalange, or be separated from the actual first surface by some material (e.g., tendon pair 210 may be inside of or on the exterior of material which makes up a glove digit. Lengths of the first and second tendons 210-*a* and 210-*b* are parallel to a bend centerline 240 of a glove digit, and the first and second tendons are formed respectively on a first and a second side of the bend centerline 240 of the glove digit. The bend centerline 240 of the glove digit is a central axis bisects an outside (or top) surface of the glove digit and that extends along a length of the glove digit from a tip (e.g., end) of the glove digit to a base of the glove digit (e.g., region attaching the glove digit to a portion of the glove body corresponding to the palms of the user hand). The bend centerline 240 interconnects bend locations of the glove digit that correspond to the joints of the phalange at which the glove digit undergoes bends responsive to bending of the phalange. The bend centerline 240 is oriented perpendicular to bend lines along which the digit is configured to bend at the bend locations.

Accordingly, in such embodiments, by providing the glove digit with a pair of flexible tendons, including a first tendon 210-*a* and a second tendon 210-*b*, to be positioned on either side of the bend centerline 240, displacement or slippage that could occur for a single tendon positioned along the bend centerline 240 can be prevented. In such embodiments, lengths of the first and second tendons 210-*a* and 210-*b* are parallel to a bend centerline 240 of the glove digit 230-*b*. In some embodiments, the first and second tendons 210-*a* and 210-*b* are formed respectively on a first and a second side of the bend centerline 240 of the glove digit 230-*b*, symmetrically and equidistant from the bend centerline 240 on the first and the second side of the bend centerline 240 of the glove digit 230-*b*.

As illustrated in FIG. 2, one tendon pair 210 is formed on (e.g., attached to, embroidered into, intertwined into, or any combination thereof) a glove digit 230-*b* of the glove body 205. The tendon pair 210 includes the first and second tendons 210-*a* and 210-*b* formed on either side of the bend centerline 240. The first and second tendons 210-*a* and 210-*b* may be any material to translate force from an actuator 270. For example, the first and second tendons 210-*a* and 210-*b* may include a wire, string, rod, other rigid structure, or an elastic structure. The first and second tendons 210-*a* and 210-*b* may have variable thickness elements. In some embodiments, the first and second tendons 210-*a* and 210-*b* may also exert or resist a lateral force to jam an adjacent portion of the user's body.

The glove digit 230-*b* includes a plurality of anchors 220 (including anchor 220-*a*, 220-*b*, and 220-*c*). In some embodiments, an anchor 220 is placed proximate to an expected position of a joint of a phalange of the user's hand. Each anchor is connected to portions of both the first tendon 210-*a* and to the second tendon 210-*b*.

The anchors 220 may be attached to the garment of the glove digit 230. The anchors 220 (including anchor 220-*a*, 220-*b*, and 220-*c*) mechanically couple (e.g., fix) the tendon pair 210 to the joints of the phalange. In some embodiments, an anchor 220 constrains lateral movement (e.g., movement perpendicular to the centerline 240) of each of the tendons 210-*a* and 210-*b* relative to a joint location. But tendons 210-*a* and 210-*b* may slide longitudinally (e.g., parallel to the centerline 240) relative to the anchors 220. The anchors 220 may also be mechanically coupled to the garment of digit 230 of the haptic glove to distribute force applied by the tendon pair 210 over areas of the garment rather than as point forces.

The garment of the glove body 205 may be any item of clothing that conforms to a portion of the user's hand and phalanges. The garment may include a textile fabric, but may also include other materials such as rubber, leather, fur, a polymer, or a combination thereof. The garment may include multiple layers. For example, the tendon pair 210 and anchors 220 may be enclosed, embroidered, intertwined or any combination thereof between two or more layers of the garment. The anchors 220 typically conform to a portion of the user's body (e.g., the joints) and may be any material more rigid than the garment of the glove body 205. For example, the anchor 220 forms an arc around the joint of a user's finger. Alternatively or additionally, the garment includes textile meshes to incorporate the anchors 220. An anchor 220 may include a hole formed through a portion of the fabric or may be formed by a loop attached to the fabric. For example, the anchor 220 may include a metal ring having a diameter greater than the tendons 210-*a* or 210-*b*. The tendons 210-*a* and 210-*b* may slip longitudinally relative to the anchor 220, but an end of the tendons 210-*a* and 210-*b* may also be longitudinally fixed to an anchor 220 (referred to as a terminal anchor).

The actuator 270 actuates the tendon pair 210 in the haptic glove 200 to control movement of the glove digit 230-*b*. In some embodiments, the actuator 270 receives first and second stimulus signals from the console 170 for controlling movement of the glove digit 230-*b*. The actuator 270 controls movement of the glove digit 230-*b*, based on the received first and second stimulus signals, by actuating, based on the first stimulus signal, the first tendon 210-*a* and in conjunction with actuating the first tendon 210-*a*, actuating, based on the second stimulus signal, second tendon 210-*b*. In some embodiments, the actuator 270 controls movement of the glove digit 230-*b* based on the first and second stimulus signals by actuating the first and second tendons 210-*a* and 210-*b* by simultaneously adjusting lengths of both the first and second tendons 210-*a* and 210-*b* based at least in part on a virtual position of the haptic glove 200 in a virtual space. The virtual space is a space in which a virtual object is placed, the virtual position of the haptic glove 200 determined based on a physical position of the haptic glove 200 relative to the virtual object.

In some embodiments, the actuator includes one or more solenoids that apply a variable force by varying an electrical current through a helical wire. To improve position sensing and control, the actuator 270 may include opposing magnetic poles stacked along the direction of each tendon of the tendon pair. These magnetic poles discretize the position of each tendon, acting as a magnetic detent, which simplifies position control and facilitates measurement of the tendons' positions.

In some embodiments, the first and second tendons 210-*a* and 210-*b* apply forces to the glove digit 230-*b*, based on the received stimulus signals, resulting in a force being applied to the phalange wearing the glove digit. In some embodiments, the first and second tendons 210-*a* and 210-*b* are configured to apply substantially equal forces to the glove digit responsive to substantially the same stimulus signals.

In some embodiments, an actuator 270 is formed on the glove body (e.g., to the glove body 205 of FIG. 2) and is coupled to the first and second tendons 210-*a* and 210-*b* of the tendon pair 210. The actuator 270 is configured to control movement of the first and second tendons by providing stimulus signals to the first and second tendons. In some embodiments, the actuator 270 is configured to simultaneously adjust the lengths of both the first and second tendons based at least in part on a virtual position of the glove body in a virtual space. The virtual space in a virtual reality environment is a space in which a virtual object is placed and the virtual position of the glove body is determined based on a physical position of the glove body relative to the virtual object.

The stimulus signals are generated by the console 170, for example, based on the responses of the first and second tendons to the bend of the phalange the console 170 may provide substantially the same stimulus signals to the first and second tendons, via the actuator 270, responsive to the substantially same responses of the first and second tendons to the bend of the phalange. In such cases, the first and second tendons of the pair of tendons may be jointly and synchronously actuated by substantially the same stimulus or actuation signals to jointly apply force to resist a user movement (e.g., grabbing a virtual marshmallow), to jointly cause a user movement (e.g., flattening fingers pushed against a virtual wall), or to jointly apply isometric force (e.g., torqueing the hand downward at the wrist while the user holds a virtual rock).

In such embodiments, and to control movement of the glove digit, the stimulus signals that adjust movement or lengths of the first and second tendons 210-*a* and 210-*b* are generated based on the measured responses of the first and second tendons to the bend of the phalange. When the first and second tendons 210-*a* and 210-*b* produce substantially the same signal for a given bend of the phalange, the actuator 270 provides substantially the same stimulus signals to the first and second tendons 210-*a* and 210-*b* responsive to the substantially same responses of the first and second tendons 210-*a* and 210-*b* to the bend of the phalange.

The actuator 270 is mechanically coupled to the tendon pair 210 to linearly push or pull the first and second tendons 210-*a* and 210-*b*. Alternatively or additionally, another activation mechanism applies force to the first and second tendons 210-*a* and 210-*b*. In some embodiments, the actuator 270 is configured to simultaneously adjust the lengths of both the first and second tendons 210- and 210-*b* according to a value of hardness of the virtual object. Alternatively, or in addition, the actuator 270 is configured to simultaneously adjust the lengths of both the first and second tendons 210-*a* and 210-*b* responsive to a relative movement between the phalange of the user hand and another portion of the user hand. Furthermore, the actuator 270 is configured to simultaneously adjust both the lengths of the first and second tendons 210-*a* and 210-*b* to resist the relative movement, responsive to determining that the relative movement deforms the virtual object. Alternatively, or in addition, the actuator 270 is configured to simultaneously adjust both the lengths of the first and second tendons 210-*a* and 210-*b*, responsive to determining that a corresponding force of the relative movement exceeds a threshold value.

The actuator 270 may apply linear forces to the first and second tendons 210-*a* and 210-*b* to linearly translate ends of the tendons 210-*a* and 210-*b* mechanically coupled to the actuator 270. Example actuator 270 may include a solenoid mechanism, another magnetic mechanism, a hydraulic mechanism, a pneumatic mechanism, a piezoelectric mechanism, or a combination thereof. The actuator 270 is anchored to the glove body in the illustrated embodiment, but it may also be anchored to another element fixed relative to the user's body.

When the actuator 270 pulls the tendon pair 210, the tendon pair exerts a force on the anchors 220, which exert a distributed force on the glove digit 230. As a result, the glove digit 230 torques the phalange toward the actuator 270. If the user exerts muscles to resist the torque around the joint, the glove digit 230 remains stationary. If the user's muscles do not exert enough force to counter the torque around the joint, the tendon pair 210 pulls the portion of the user's body toward the actuator 270 by pulling the anchors 220 closer to the actuator 270 and closer to each other. For example, if an actuator 270 on the back of a user's hand pulls a tendon pair 210 on the back of a user's finger, the actuator 270 causes the glove digit 230 to either resist flexion of the finger or cause extension of the finger. Conversely, an actuator on the palm of a user's hand may pull a tendon pair 210 on the front of a user's finger to either resist extension of the finger or cause flexion of the finger. The actuator 270 may exert a variable force on the tendon pair 210 to cause a variable torque around the user's joint.

In some embodiments, the haptic glove 200 includes textile meshes, in accordance with various embodiments. A textile mesh includes a network or lattice of textile segments to distribute force exerted by a tendon pair through the glove digit 230. A textile segment may be a thread or string made of a natural material (e.g., cotton, hemp) or synthetic material (e.g., nylon, polyester). The textile mesh may be enclosed between two layers of the garment to prevent friction on the user's skin. The textile segments may be anchored to each other, to the garment, or both. When textile segments are attached, the anchors 220 may restrict movement along both attached segments or along only one of the textile segments. For example, the connector 220 is a loop attached to one textile segment that allows another textile segment to slide through the loop.

In some embodiments, the haptic glove 200 further includes control wires to convey tactile sensations from a virtual reality environment to the actuator 270. For example, when the user holds a virtual object, and the tendons undergo compressive of tensile deformation or force, the control wires convey the measured responses to the actuator. Conversely, the control wires may also carry actuation signals from the actuator 270 to the first and second tendons 210-a and 210-b.

Moreover, in some embodiments, one or more of the glove digits 230a, 230-b, 230-c, 230-d, include one or more additional flexible tendons that are positioned a back surface of the digit that is opposite the top surface of the digit. The one or more additional flexible tendons may be substantially similar to, e.g., the tendon pair 210, except that the additional tendons run along the back surface of the digit. These additional tendons may, e.g., be used to resist flexion, resist extension, or some combination thereof.

Anchors, Connectors, and Tendon Segments

Figure 3:
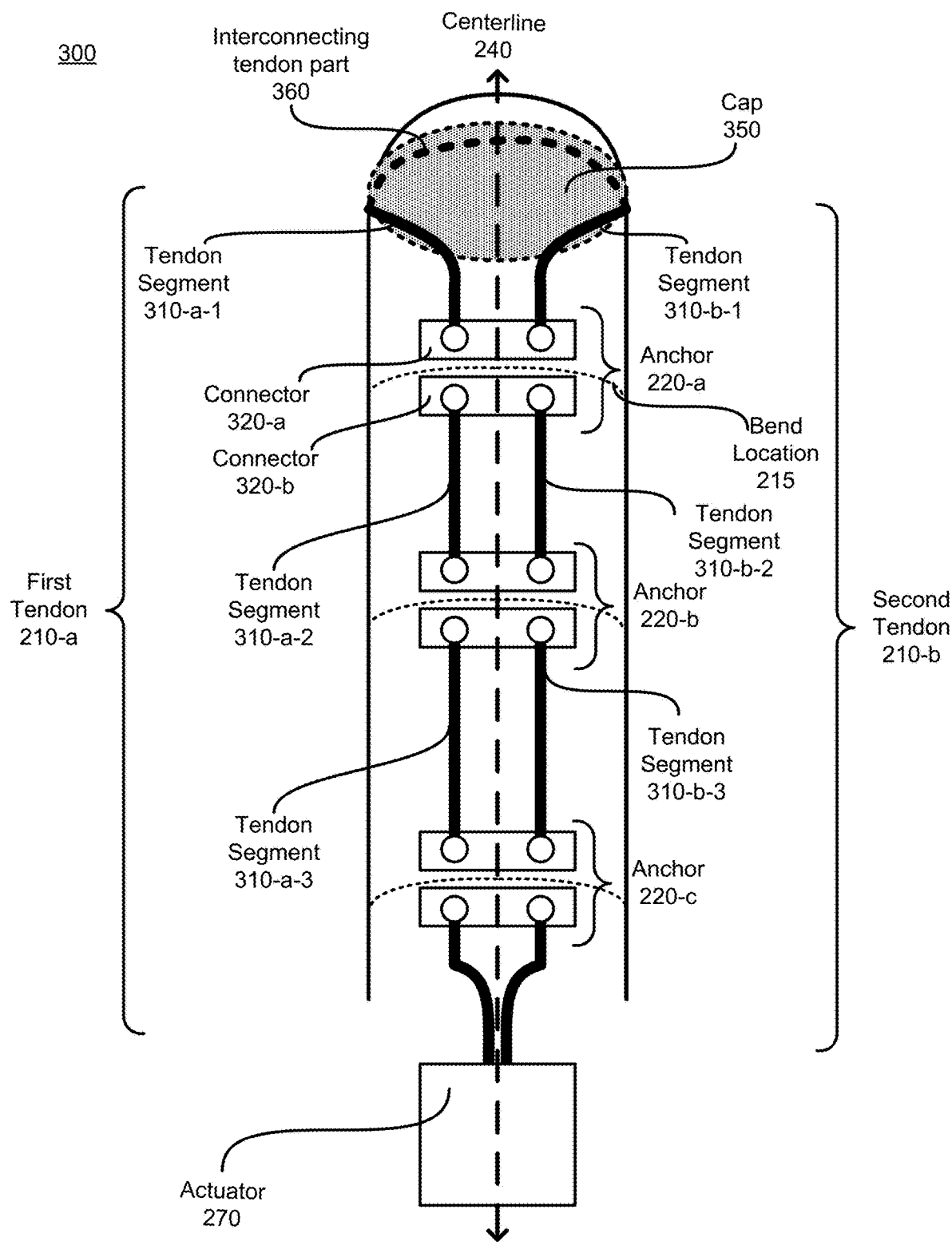
FIG. 3 illustrates a haptic glove digit of the haptic glove of FIG. 2, in accordance with one or more embodiments.

FIG. 3 illustrates a detailed view of a glove digit 300 (e.g., 230-b) of the haptic glove 200 in FIG. 2, according to an embodiment. The glove digit 300 has a pair of tendons (including the first tendon 210-a and second tendon 210-b) formed on either side of a bend centerline 240 of the glove digit 300, in accordance with one or more embodiments.

The glove digit 300 includes anchors 220 (e.g., including anchors 220-a, 220-b, and 220-c) placed at bend locations 215. A bend location 215 is a location in the glove digit 300 that corresponds to a joint of a phalange of a hand. As illustrated in FIG. 3, an anchor 220-a corresponding to a bend location 215 may include a pair of connectors 320-a and 320-b attached to the glove digit 300. The connectors 320-a and 320-b are configured to be placed on opposite sides of a bend line of the corresponding bend location. Moreover, while FIG. 3 is in the context of tendons along a top surface of the glove digit 300, it may also be configured to operate on a back surface of the glove digit 300. Such a configuration may be used to, e.g., resist flexion, resist extension, or some combination thereof, of the glove digit 300.

In some embodiments, the first tendon 210-a comprises a first plurality of tendon segments (e.g., 310-a-1, 310-a-2, 310-a-3, and so on). At least one tendon segment of tendon 210-a is configured to be positioned between each pair of adjacent bend locations. A pair of adjacent tendon segments (e.g., 310-a-1 and 310-a-2) of the first plurality of tendon segments are interconnected by a corresponding anchor (e.g., anchor 220). Similarly, the second tendon 210-b comprises a second plurality of tendon segments (e.g., 310-b-1, 310-b-2, 310-b-3, and so on). At least one tendon segment of tendon 210-b is configured to be positioned between each pair of adjacent bend locations. A pair of adjacent tendon segments (e.g., 310-b-1 and 310-b-2) of the second plurality of tendon segments are interconnected by a corresponding anchor 220.

In some embodiments, each of the connectors 320-a and 320-b are attached to a respective segment of the first tendon 210-a and a respective segment of the second tendon 210-b. For example, connector 320-a is connected to tendon segment 310-a-1 of the first tendon 210-a and to tendon segment 310-b-1 of the first tendon 210-b. Similarly, connector 320-b is connected to tendon segment 310-a-2 of the first tendon 210-a and to tendon segment 310-b-2 of the first tendon 210-b. In such embodiments, at least one connector of each anchor 220 includes an actuation mechanism to provide stimulus signals to the tendon segments connected to that connector. Control wires (not shown) connect each of the actuation mechanisms to their respective tendon segments. The control wires carry actuation signals from the actuator 270 to their respective tendon segments.

In such embodiments, the first tendon 210-a comprises a plurality of tendon segments including a first tendon segment 310-a-1 and a second tendon segment 310-a-2. The first and second tendon segments 310-a-1 and 310-a-2 are formed on opposite sides of and connected to a first anchor 220-a of the plurality of anchors. Similarly, the second tendon 210-b comprises a plurality of tendon segments including a third tendon segment 310-b-1 and a fourth tendon segment 310-b-2. The third and fourth tendon segments 310-b-1 and 310-b-2 are formed on opposite sides of and connected to the first anchor 220-a of the plurality of anchors. In such embodiments, the first tendon segment 310-a-1 and third tendon segment 310-b-1 are connected to the first connector 320-a of the first anchor 220-a. Furthermore, in such embodiments, the second tendon segment 310-a-2 and fourth tendon segment 310-b-2 are connected to the second connector 320-b of the first anchor 220-a.

Stated differently, the first and second tendons 210-a and 210-b of the tendon pair 210 include tendon segments 310-a and 310-b respectively, which are fixed to the anchors 220 attached to the garment of the glove digit 300. Alternatively, tendon segments 310-a and 310-b respectively are connected to the individual connectors 320-a and 320-b of the anchor 220-a. attached to the garment of the glove digit 300. As described with reference to FIG. 3, the anchor 220 may permit longitudinal movement by the tendon segments 310-a and 310-b but restrict lateral movement of the tendon segments 310-a and 310-b. The tendon pair 210 is mechanically coupled at one end to actuator 270.

Each of the tendon segments 310 may be driven by separate stimulus signals (not shown) received from the actuator 270 to apply force to the different anchors 220 attached to the glove digit 300. Accordingly, the actuator 270 is able to individually actuate one or more tendon segments 310. The tendon segments 310 may act on both sides of a bend location 215 to apply forces to flex or extend portions of a finger within the glove digit 300.

The tendon segments 310 are formed from any material used to form tendons 210-a and 210-b. The tendon segments 310 may be fixed rigidly to anchors 220 (e.g., via connectors of the anchors 220) to permit no movement between the ends of the tendon segments 310 and the correspond anchors 220 to which the tendon segments are attached. In some instances, an end of a tendon segment may have partial mobility relative to another connected tendon segment. Alternatively or additionally, and as illustrated in FIG. 3, an end of a tendon segment 310-a-1 may be disconnected from and move independent relative to another tendon segment 310-a-2. For example, an end of a mobile tendon segment may be knotted to another tendon segment via an anchor to allow longitudinal movement with respect to the other tendon segment but to fix the mobile tendon segment laterally with respect to the other tendon segment. In some embodiments, and as illustrated in FIG. 3, the first and second tendons 210-a and 210-b fold along first and second lateral sides of the glove digit 300 to be interconnected (e.g., see interconnecting tendon part 360) on a portion of the glove digit 300 that corresponds to a second surface of the phalange (e.g., a pad of a finger) that is opposite to the first surface of the phalange. For example, if the lengths of the first and second tendons 210-a and 210-b are positioned on a first surface of the glove digit corresponding to a back surface of a finger of a user's hand, then the first and second tendons 210-a and 210-b fold along sides of the finger of the user hand to be interconnected on a second surface of the glove digit corresponding to the front side of the finger.

In some embodiments, when the first and second tendons 210-*a* and 210-*b* are interconnected at an end of the glove digit 300, the end of the glove digit 300 (at which the tendons are interconnected) comprises a rigid cap 350 enclosing a region where the first and second tendons 210-*a* and 210-*b* are interconnected. In some embodiments, a rigid cap 350 includes a band of material (e.g., leather, plastic, etc.) positioned around (e.g., circumscribing) a segment of the glove digit adjacent to the tip of the glove digit (furthest from the base of the glove digit). Alternatively, or in addition, the rigid cap 350 corresponds to a thimble positioned around (e.g., circumscribing) the tip of the glove digit as well as a portion of the segment of the glove digit adjacent to the tip of the glove digit. In either case, the rigid cap 350 encloses (e.g., overlaps and circumscribes) the region of the glove digit 300 where the first and second tendons 210-*a* and 210-*b* are interconnected.

Flexible Ribbon and Tendon Interconnects

Figures 4, 5:
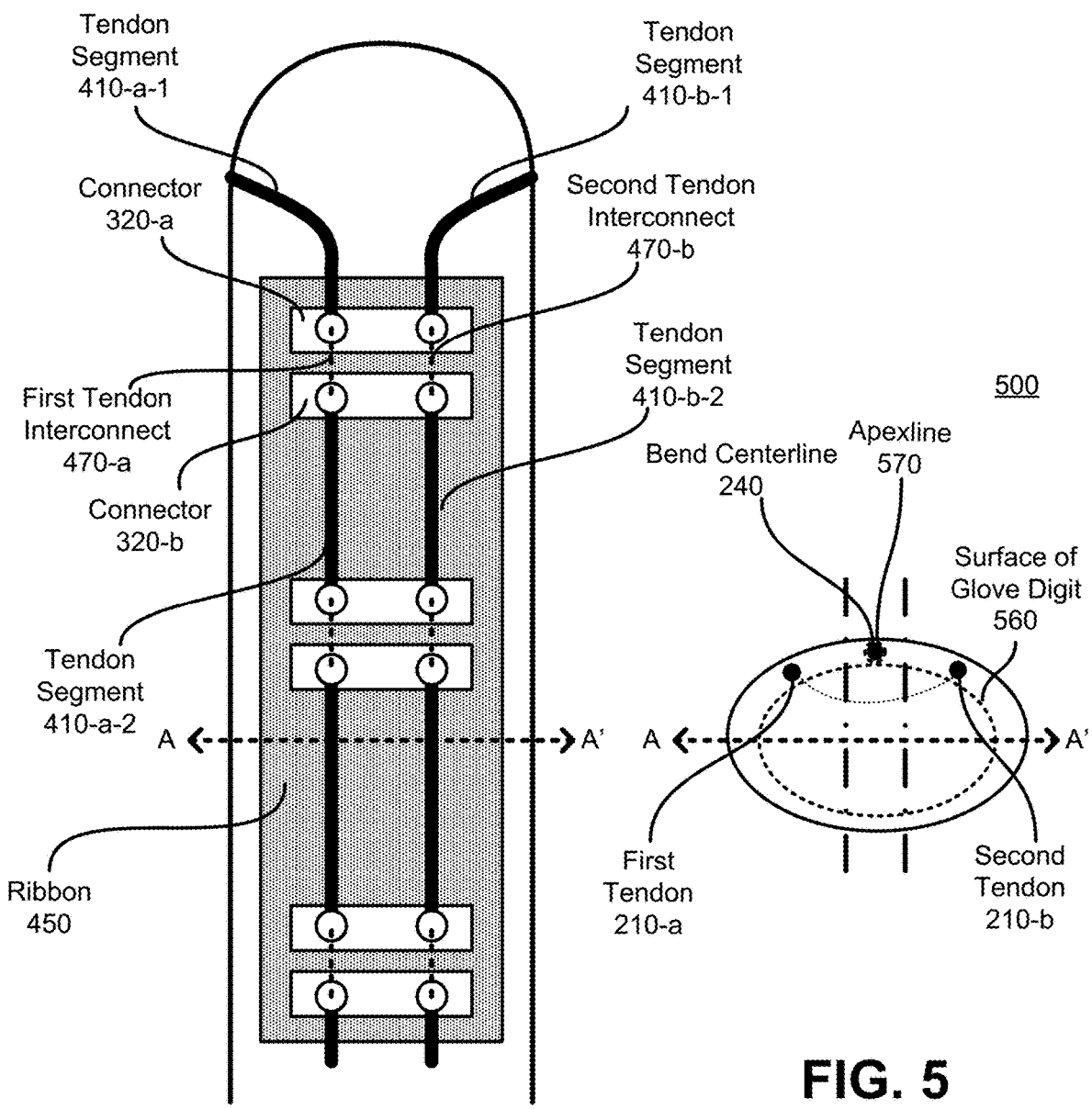
FIG. 4 illustrates another embodiment of a portion of a haptic glove digit of the haptic glove of FIG. 2.
FIG. 5 illustrates a cross-sectional view of a haptic glove digit, in accordance with one or more embodiments.

FIG. 4 illustrates another embodiment of a portion of a glove digit 400 of the haptic glove 200 of FIG. 2. In some embodiments, the first tendon 210-*a* comprises a first plurality of tendon segments (e.g., 410-*a*-1, 410-*a*-2, 410-*a*-3, and so on) connected to a respective connector (e.g., tendon segment 410-*a*-1 connected to connector 420-*a*, and tendon segment 410-*a*-2 connected to connector 420-*b*) of the anchor 220; and the second tendon 210-*b* comprises a second plurality of tendon segments (e.g., 410-*b*-1, 410-*b*-2, 410-*b*-3, and so on) connected to a respective connector (e.g., tendon segment 410-*b*-1 connected to connector 420-*b* and 410-*b*-2 connected to connector 420-*b*) of the anchor 220.

In some embodiments, the anchor 220 corresponding to the given bend location further comprises a pair of tendon interconnects (e.g., a first tendon 470-*a* and a second tendon interconnect 470-*b*) connected between connectors 420-*a* and 420-*b* of the anchor 220. The adjacent tendon segments of the first plurality of tendon segments (e.g., segment 410-*a*-1 and 410-*a*-2) are interconnected at the anchor 220 via a first tendon interconnect 470-*a* of the pair of tendon interconnects. Similarly, the adjacent tendon segments of the second plurality of tendon segments (e.g., segment 410-*b*-1 and 410-*b*-2) are interconnected at the anchor 220 via a second tendon interconnect 470-*b* of the pair of tendon interconnects. The tendon interconnects may be made of the same or different material than the tendon segments and may further allow longitudinal movement of the tendon segments with respect to the other tendon segment but constrain or limit lateral movement or slippage of the tendon segments with respect to other tendon segments.

In some embodiments, the glove digit 400 further comprises an elastic ribbon 450 configured to be positioned on a first surface of the glove digit (e.g., on a same surface as the tendon pair 210). In such embodiments, the ribbon 450 may be actuated and may deform based on a stimulus signal received from the actuator 270 in order to restrict a movement of the glove digit (and consequently, of the phalange of the user hand). In some embodiments, the deformation and actuation of the ribbon 450 is independent of the deformation and actuation of the first and second tendons 210-*a* and 210-*b*. In some embodiments, the first and second tendons 210-*a* and 210-*b* are positioned over (e.g., coupled to, attached to, fixed to, or any combination thereof) ribbon 450. The ribbon 450 provides additional support to the first and second tendons 210-*a* and 210-*b* and secures the tendon pair 210 from slippage or lateral movement as the phalange bends or flexes. A length of the elastic ribbon 450 is parallel to the bend centerline 240 of the phalange and the elastic ribbon 450 overlaps the first and second tendons 210-*a* and 210-*b*. In such embodiments, the elastic ribbon 450 has a first value of elasticity in a central region along the bend centerline 240 and a second value of elasticity along edge regions distal from the bend centerline 240. In some embodiments, the first value of elasticity is greater than the second value of elasticity, thus permitting a greater degree of motion of flex of the phalange nearer the center of the joint. Variation in degree of elasticity may be obtained by using different materials for regions and having distinct elastic moduli or through design choice (e.g., the central region of the ribbon may be thicker than the region of the ribbon).

FIG. 5 illustrates a cross-sectional view 500 of a glove digit 300, in accordance with one or more embodiments. As illustrated in FIG. 5, the first and second tendons 210-*a* and 210-*b* are formed on a first and second side of a bend centerline 240 of the glove digit 300. In such embodiments, the first and second tendons 210-*a* and 210-*b* are formed on a different plane than an apexline 570 of a curved contour of a first surface 560 of the glove digit 300 on which the first and second tendons 210-*a* and 210-*b* are positioned. An actuated tendon that runs along the bend centerline of the phalange (e.g., at the apexline 570) may undergo lateral displacement or slippage off the bend centerline when the body part undergoes frequent bends and flexes. The present embodiments that provide the first and second tendons 210-*a* and 210-*b* on a different plane than an apexline 570 and on either side of the bend centerline 240 prevent displacement or slippage that could occur in the case of a single tendon running along apexline 570.

While some of the preceding discussion of the embodiments refers to a virtual reality garment such as a haptic glove that encloses a user's hand or figures, in other embodiments, the tendon pairs described herein can be adapted to other types of garments that apply force to other parts of the body (e.g., elbows, torso, knees, or ankles). In some embodiments, the haptic feedback mechanism may be part of garment worn on another portion of the body. For example, the haptic feedback mechanism may be a sleeve wearable around a joint such as a wrist, elbow, or knee. Using a pair of tendons formed along the wrist, elbow, or knee, but on opposite sides of a bend centerline of the wrist, elbow, or knee, the sleeve may torque the joint to simulate weight of a virtual object. The sleeve may vary the orientation of the applied torque according to an orientation of the joint tracked by the System. For example, as a user lifts a heavy virtual object from the user's waist to the user's shoulder, the pair of tendons around and on either side of the user's wrist synchronously apply a downward torque around the user's wrist to simulate gravitational force on the virtual object. The sleeve applies torque in in an orientation consistent with gravity according to the joint's orientation relative to gravity.

Additional Configuration Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:

1. A wearable device comprising:
a wearable garment including a sleeve corresponding to a human body part, the sleeve having an elastic ribbon positioned on the surface of the sleeve and a pair of flexible tendons, including a first and a second tendon that are parallel to a bend centerline that bisects a surface of the sleeve, and the first and second tendons are positioned respectively on opposite sides of the bend centerline and the elastic ribbon is positioned parallel to the bend centerline to overlap the first and second tendons; and
an actuator coupled to the sleeve and the first and second tendons, the actuator configured to actuate the tendons to control movement of the sleeve.

2. The wearable device of claim 1, wherein the sleeve further comprises a plurality of anchors, and each anchor of the plurality of anchors is connected to the first tendon and to the second tendon and is configured to be placed at a respective bend location of the sleeve.

3. The wearable device of claim 2, wherein a first anchor, of the plurality of anchors, comprises a first connector and a second connector that are coupled to the sleeve on opposite sides of a bend location, and the first connector and the second connector are both attached to the first tendon and to the second tendon.

4. The wearable device of claim 1, wherein the first and second tendons are interconnected at an end of the sleeve and the end of the sleeve comprises a rigid cap enclosing a region where the first and second tendons are interconnected.

5. The wearable device of claim 1, wherein the elastic ribbon has a first value of elasticity in a central region along the bend centerline and a second value of elasticity along edge regions distal from the bend centerline, the first value being greater than the second value.

6. The wearable device of claim 1, wherein the actuator is configured to simultaneously adjust lengths of both the first and second tendons based at least in part on a virtual position of the wearable garment in a virtual space, the virtual space in which a virtual object is placed, the virtual position of the sleeve determined based on a physical position of the wearable garment relative to the virtual object.

7. The wearable device of claim 1, wherein the first and second tendons are positioned equidistant from the bend centerline on the first and the second side of the bend centerline of the sleeve and are positioned on a plane distinct from a plane of an apexline of a contour of the surface of the sleeve.

8. The wearable device of claim 1, wherein the sleeve is part of a haptic glove.

9. The wearable device of claim 1, wherein the wearable garment is a haptic glove and the sleeve is part of a glove body wearable around a wrist of a user, the wearable garment further comprising:
one or more control wires coupled to the first and second tendon.

10. The wearable device of claim 1, wherein the wearable garment is a haptic glove and the sleeve is part of a glove body wearable around a wrist of a user.

11. The wearable device of claim 10, wherein:
the first tendon comprises a plurality of tendon segments including a first tendon segment and a second tendon segment, the first and second tendon segments formed on opposite sides of and connected to a first anchor of a plurality of anchors, wherein the first anchor comprises a first connector and a second connector that are coupled to the sleeve on opposite sides of a bend location and the first connector and the second connector are both attached to the first tendon and to the second tendon;
the second tendon comprises a plurality of tendon segments including a third tendon segment and a fourth tendon segment, the third and fourth tendon segments formed on opposite sides of and connected to the first anchor of the plurality of anchors;
the first and third tendon segments are connected to the first connector of the first anchor; and
the second and fourth tendon segments are connected to the second connector of the first anchor.

12. The wearable device of claim 11, wherein:
the first and second tendon segments are physically connected via a first tendon interconnect positioned between the first connector and the second connector; and
the third and fourth tendon segments are physically connected via a second tendon interconnect positioned between the first connector and the second connector.

* * * * *